United States Patent
Morris et al.

(10) Patent No.: US 11,978,330 B2
(45) Date of Patent: May 7, 2024

(54) SENSING SYSTEM FOR POOL FLOATING DEVICE

(71) Applicants: Clint Morris, Mesa, AZ (US); Gary Morris, Gilbert, AZ (US)

(72) Inventors: Clint Morris, Mesa, AZ (US); Gary Morris, Gilbert, AZ (US)

( * ) Notice: Subject to any disclaimer, the term of this patent is extended or adjusted under 35 U.S.C. 154(b) by 68 days.

(21) Appl. No.: 17/844,253

(22) Filed: Jun. 20, 2022

(65) Prior Publication Data

US 2023/0410625 A1 Dec. 21, 2023

(51) Int. Cl.
*G08B 21/08* (2006.01)
*G01C 9/04* (2006.01)
*H02J 7/35* (2006.01)

(52) U.S. Cl.
CPC ............. *G08B 21/084* (2013.01); *G01C 9/04* (2013.01); *H02J 7/35* (2013.01)

(58) Field of Classification Search
CPC ............ G08B 21/084; G01C 9/04; H02J 7/35
See application file for complete search history.

(56) References Cited

U.S. PATENT DOCUMENTS

| | | | | |
|---|---|---|---|---|
| 4,333,094 A * | 6/1982 | Osborne | ............. | G08B 21/084 340/565 |
| 4,594,582 A * | 6/1986 | Thompson | ........... | G08B 21/084 340/693.5 |
| 5,681,110 A * | 10/1997 | Burzacchi | ................ | G01K 1/06 374/208 |
| 8,134,462 B1 * | 3/2012 | Tran | ..................... | G08B 21/084 340/426.25 |
| 10,150,680 B1 * | 12/2018 | Kurani | ................... | G01N 33/18 |
| 11,322,010 B1 * | 5/2022 | Madden | .............. | G08B 21/086 |
| 11,754,545 B2 * | 9/2023 | Key | ................... | G01N 27/4168 205/787.5 |
| 2006/0292043 A1 * | 12/2006 | Biberger | ................ | G01N 33/18 73/53.01 |
| 2008/0106422 A1 * | 5/2008 | Sparks | .................... | E04H 4/148 340/573.6 |
| 2008/0206722 A1 * | 8/2008 | Fukami | .................. | G09B 21/02 434/114 |
| 2009/0165207 A1 * | 7/2009 | Reed | ........................ | B60T 7/10 5/608 |
| 2014/0022292 A1 * | 1/2014 | Jones | .................. | G01F 23/2961 347/7 |
| 2017/0079257 A1 * | 3/2017 | Haensgen | ............. | H04W 76/14 |
| 2019/0025273 A1 * | 1/2019 | Brondum | ............... | G01N 27/07 |

(Continued)

FOREIGN PATENT DOCUMENTS

WO WO-0239107 A1 * 5/2002 ......... G01N 33/1886
WO WO-2018198018 A1 * 11/2018 ............. G01F 15/06

*Primary Examiner* — Chico A Foxx
(74) *Attorney, Agent, or Firm* — Accelerate IP LLC

(57) ABSTRACT

A sensing system for a floating pool system for detecting and alerting a user of disturbances and detecting various levels and releasing chemicals into a liquid medium. The system comprises a controller that can comprise a wireless communication module and at least one sensor, and a receiving device can be configured to receive a signal from the wireless communication module. The controller can comprise at least one tilt sensor that is generally in an open position and closes with a waking event. The controller sends a message to the receiving device when a waking event occurs, alerting the user to a disturbance and possibly dangerous situation.

14 Claims, 7 Drawing Sheets

(56) References Cited

U.S. PATENT DOCUMENTS

| | | | |
|---|---|---|---|
| 2019/0287378 A1* | 9/2019 | Rogers | G01S 15/86 |
| 2020/0135000 A1* | 4/2020 | Asiri | G08B 21/084 |
| 2022/0044544 A1* | 2/2022 | Rogers | H04N 23/60 |

* cited by examiner

SENSING SYSTEM FOR POOL FLOATING DEVICE

TECHNICAL FIELD

The present specification relates to an alarm system, more particularly to an alarm system which detects and sends an alarm to a user on a portable device when a relatively large object, such as a child, enters into a pool, or other body of water.

BACKGROUND

In recent years, many homeowners are putting swimming pools in the backyard of their home. Pools provide hours of entertainment, and low impact exercise. However, they can also present a safety hazard to young children or others that require supervision around bodies of water. Drownings in home pools have become so prevalent in areas such as Arizona and Florida that many people are dissuaded from purchasing a swimming pool. Pool owners have tried various means of reducing the danger of drownings in an unattended pool including building fences around the boarder of the pool, covering the pool, or using pool alarms that use motion sensors to alert the user if someone has entered the pool area. Other types of alarms are placed in the pool using accelerometers to determine when a relatively large object, such as a child, has entered the pool.

However, accelerometers typically use a lot of power requiring frequent battery changes if safety is to be maintained. Additionally, accelerometers are very sensitive and require precise calibration to recognize the difference between a large object falling into the body of water and wind blowing the alarm around the pool. Furthermore, most alarms only have one function, which is to detect an object in the pool and do not have any additional functionality like testing the Ph levels of the water and releasing chlorine into the water. Despite these precautions, swimming pools continue to be dangerous and an inexpensive, reliable system for preventing drownings is still needed.

SUMMARY

Aspects disclosed herein comprise a sensing system for a pool float for detecting and alerting a user of disturbances and detecting chemical levels and releasing chemicals into a liquid medium comprising an alarm body that is comprised of a housing configured to couple into a float. The system also comprises a controller coupled to the alarm body that comprises a wireless communication module and at least one sensor, a power source that is electrically coupled to the controller, and a receiving device wirelessly coupled to the controller.

The system can comprise a float which is a body capable of buoyancy in a liquid medium with an upper portion and a lower portion. The lower portion can be configured to sit below the water and the upper portion can be configured to float partially below and partially above the water. The upper portion can also comprise an upper cavity that can at least partially extend vertically through the upper portion and the lower portion and have at least one port that can be open to the water.

The lower portion can further comprise a cavity where at least one chemical can be dispensed into the water through at least one port.

The at least one sensor can be at least one of a tilt sensor, a chlorine sensor, thermometer, camera, motion sensor, a pH sensor, and the like. In one or more embodiments the sensor is a tilt sensor. In one ore more embodiments the sensor is a plurality of tilt sensors coupled to the controller in an isosceles triangle, and at an angle of at least 10 degrees, that are configured to sense tilting in any direction.

The system can comprise at least a wake and a sleep mode, wherein wake mode is active after a waking event, and sleep mode is determined by the tilt sensor being in the open position.

In one or more embodiments the system has at least one sensing element that can be in contact with the water.

The power source can be at least one of at least one battery, at least one long life battery, at least one rechargeable battery, at least one disposable battery, at least one AAA sized battery, at least one photovoltaic cell, and the like. The photovoltaic cell can be a power source, or a recharging device.

The controller can further comprise a wake button to manually initiate wake mode.

The float and/or alarm body can be comprised of at least one of polyethylene terephthalate glycol (PETG), nickel alloy, and fiberglass, or other material that can withstand prolonged sun exposure and contact with chlorinated water.

The wireless communication module can comprise Wi-Fi, cellular, Bluetooth, and/or the like.

A method of detecting and alerting a user of disturbances within water can comprise coupling an alarm body, controller, and power source to a float. The controller can comprise a tilt sensor. Determining if the controller is in sleep mode or wake mode based on the tilt sensor being tilted to at least a waking angle. Sending a signal to a receiving device to alert the user of the waking event, or that there has been a disturbance in the water. Resetting the controller to sleep mode after the receiving device acknowledges receipt of the alert message.

BRIEF DESCRIPTION OF THE DRAWINGS

These and other features, aspects, and advantages of the present specification will become better understood with regard to the following description, appended claims, and accompanying drawings where:

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U. S. C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

While the following description relates to swimming pools, it may be equally applied to any standing body of water or other fluid.

Figure 1:
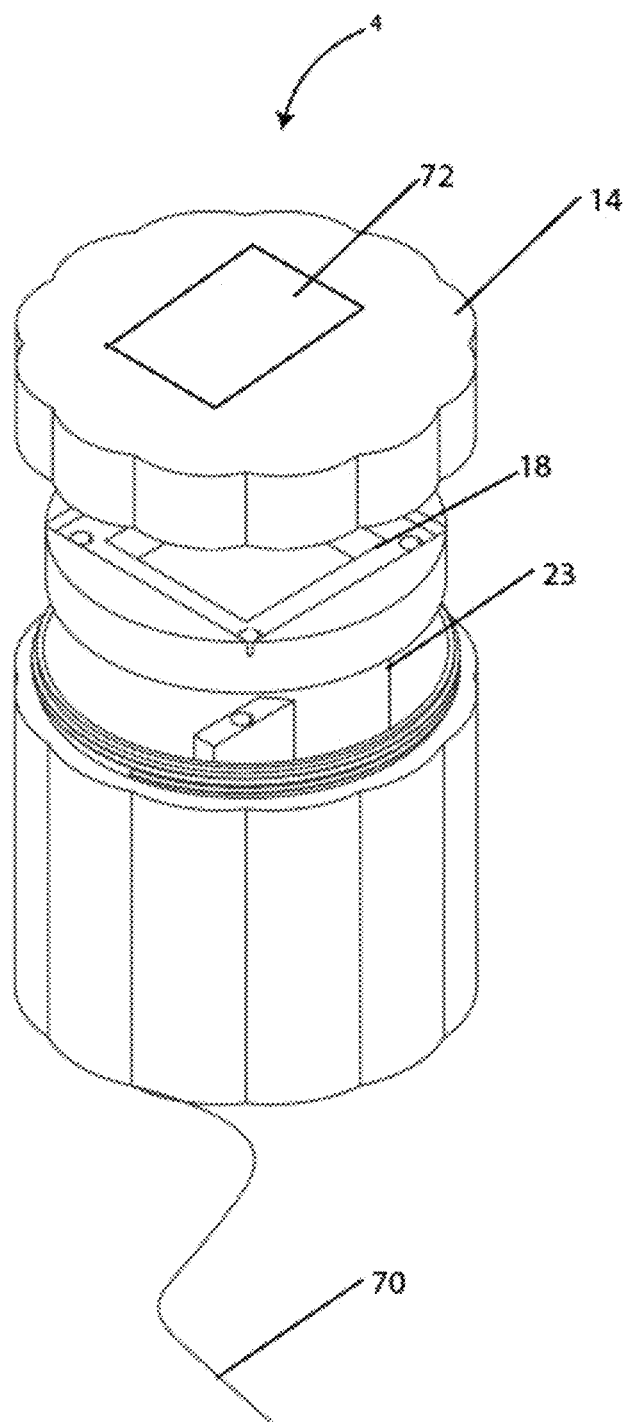
FIG. 1 is an isometric view of one embodiment of a sensing system for pool float in accordance to one, or more embodiments.

Referring to FIG. 1, an isometric view of a sensing system for a pool float shown generally at 4. The sensing system 4 can comprise an alarm body 14, which creates a housing for a controller 18, and a power source 23. The power source 23 is electrically coupled to the controller 18. The alarm body 14 can be sealed to be watertight. It can be permanently sealed, or openable. It can be sealed by using screws, clamps, adhesive, seals, o-rings, gaskets, and the like. The alarm body 14 can comprise any material that can withstand the outside elements and chemicals associated with pools, such as, plastic, polyethylene terephthalate glycol (PETG), nickel alloys, fiberglass, and the like. In one or more embodiments the alarm body 14 is buoyant.

The power source 23 can be anything that can provide approximately 2.4V of power or more. The power source 23 can comprise at least one of at least one of a battery and a photovoltaic cell. The battery may be at least one long life battery, at least one rechargeable battery, at least one disposable battery, at least one AAA alkaline battery, or the like. The photovoltaic cell can provide power directly, or can charge one or more batteries that can provide power to the controller.

The sensing system 4 can comprise at least one sensing element 70 that can be in contact with the water. The sensing element 70 can be coupled to the controller 18.

Figure 2:
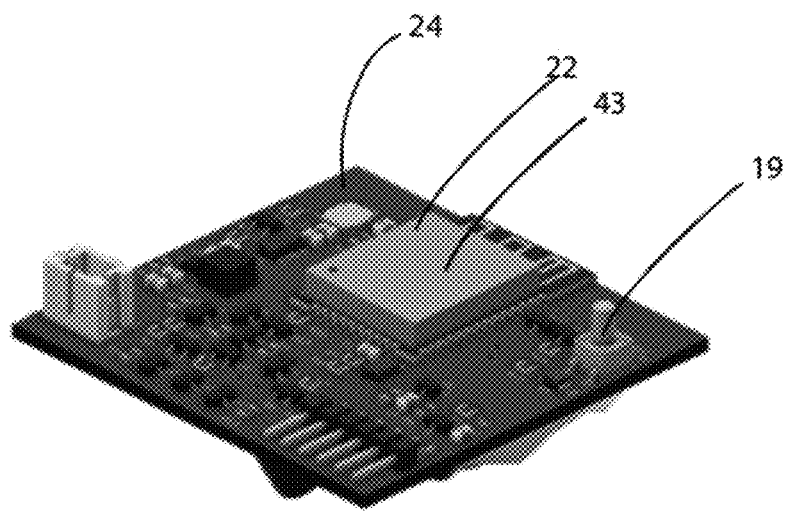
FIG. 2 is a top view of the controller for one embodiment of a sensing system for pool float in accordance to one, or more embodiments.
Figure 3:
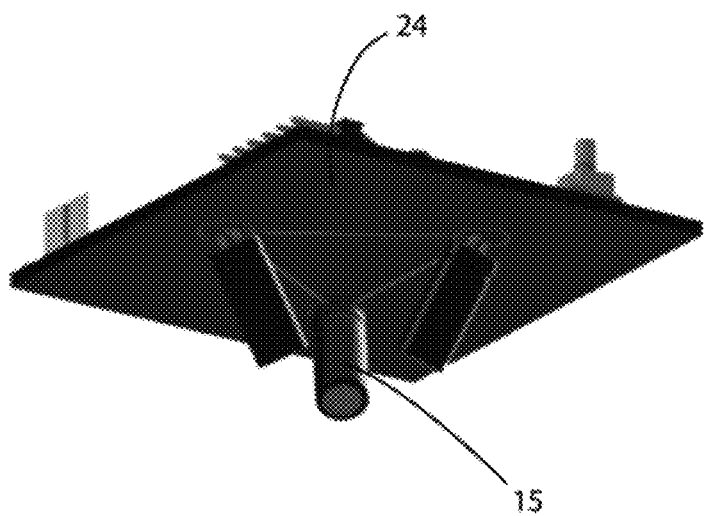
FIG. 3 is a bottom isometric view of the tilt sensor on the controller for one embodiment of a sensing system for pool float in accordance to one, or more embodiments.
Figure 4:
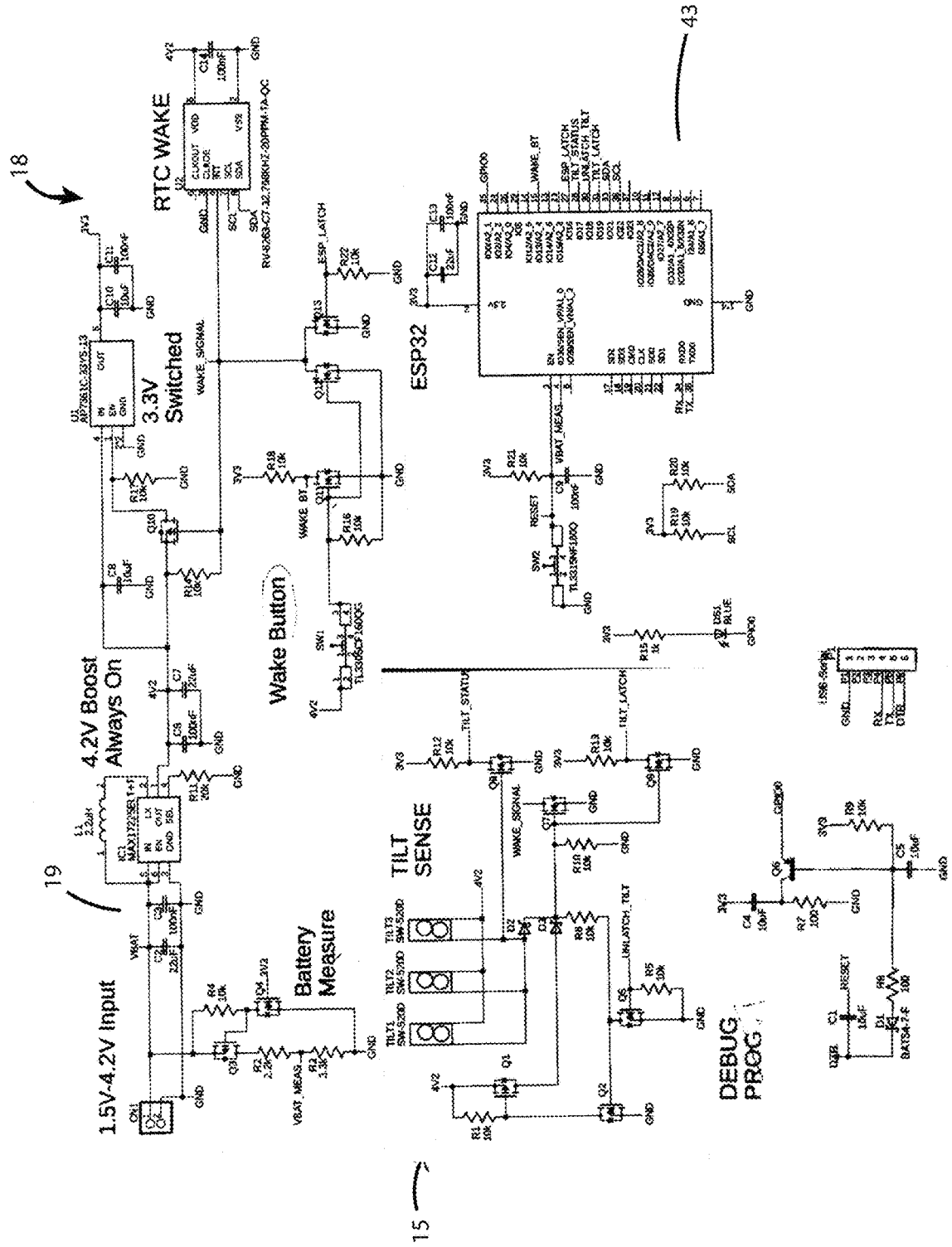
FIG. 4 is a is a schematic view of one embodiment of a sensing system for pool float in accordance to one, or more embodiments.
Figure 6:
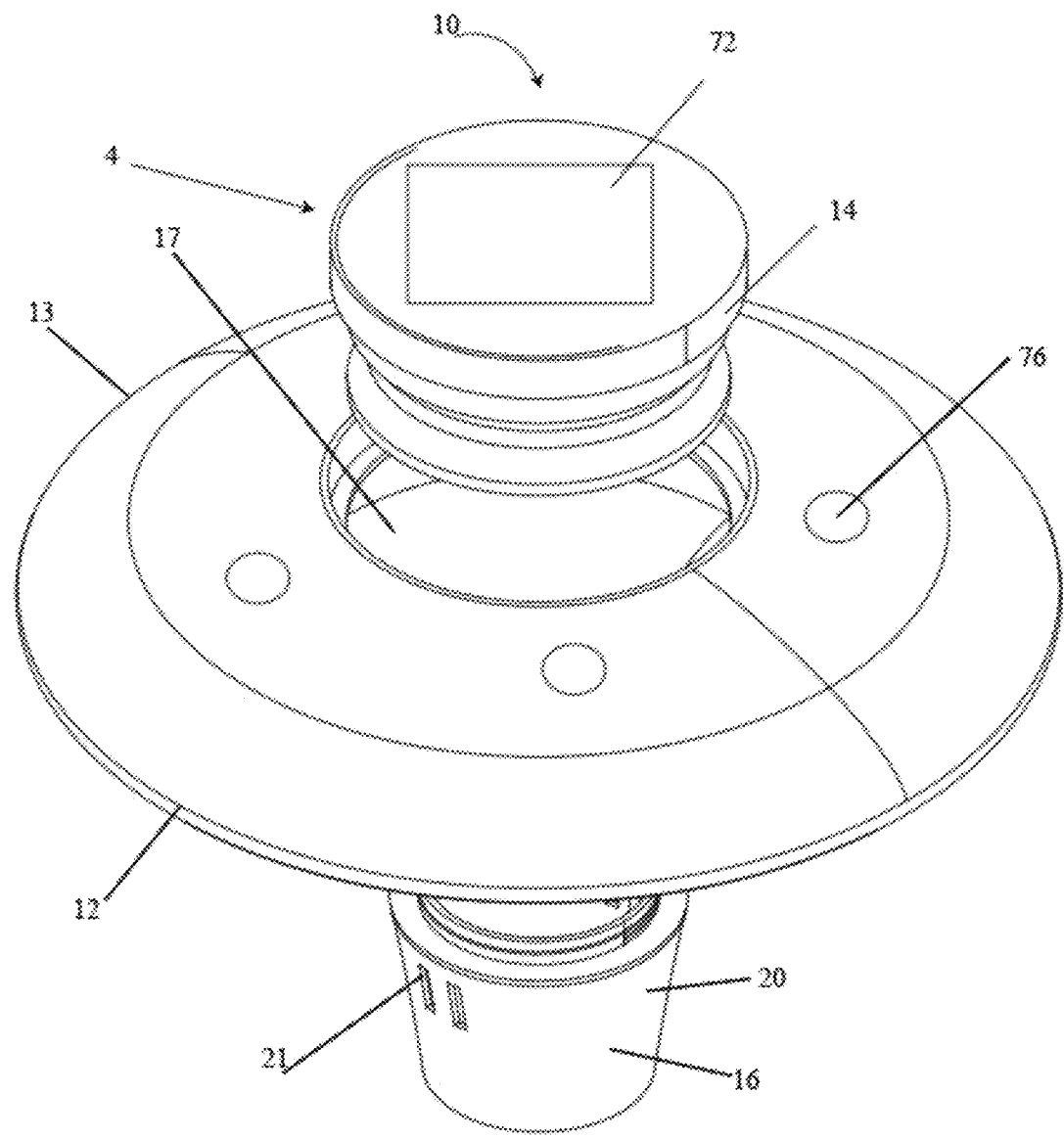
FIG. 6 is an isomeric view of one embodiment of a pool floating system in accordance to one, or more embodiments.

Referring now to FIGS. 2-4, the controller shown generally at 18 can comprise a printed circuit board (PCB) 24, at least one microcontroller 22, a wireless communication module 43, and at least one sensor. The wireless communication module 43 is communicatively coupled to at least one receiver 54 (FIG. 6). The receiver 54 can be any device capable of receiving a wireless communication signal and may be coupled to an interface that can present a message to a user, such as, for example, a smartphone, a smart speaker, a pager, a smart refrigerator, a smart screen, a tablet, a car navigation system, and the like.

The at least one sensor can be at least one tilt sensor 15, at least one chlorine sensor, at least one thermometer, at least one camera, at least one pH sensor, and the like. In one or more embodiments the at least one tilt sensor is a plurality of tilt sensors. The tilt sensors are arranged such that they are able to sense movement in any direction and optimize the detection of the slightest movement of the sensing system 4. In one or more embodiments the at least one tilt sensor 15 is three tilt sensors coupled to the controller 18 and PCB 24, forming a triangular array equidistant from the center of the PCB 24 and from each other. The axis of the tilt sensors 15 can be tilted toward the center of the PCB 24 at an angle of, for example, between 5 degrees and 90 degrees, more preferably between 10 and 50 degrees, still more preferably at approximately 20 degrees, or the like, from the plane of the PCB 24. The tilt sensor 15 can be coupled to the same PCB 24 as the wireless module, or it can be connected to a separate PCB that is coupled to the controller 18. Each tilt sensor 15 can be any type of tilt sensor, such as, ball tilt switch, single axis, dual axis, force balance, accelerometer, or the like.

The controller can comprise a wake button 19. The wake button 19 can be a physical button, or it can be a digital button or a programmed response to a signal from, for example, a mobile device application. It can be coupled to the printed circuit board 24, the receiving device 54, an app, or the like.

Figure 5:
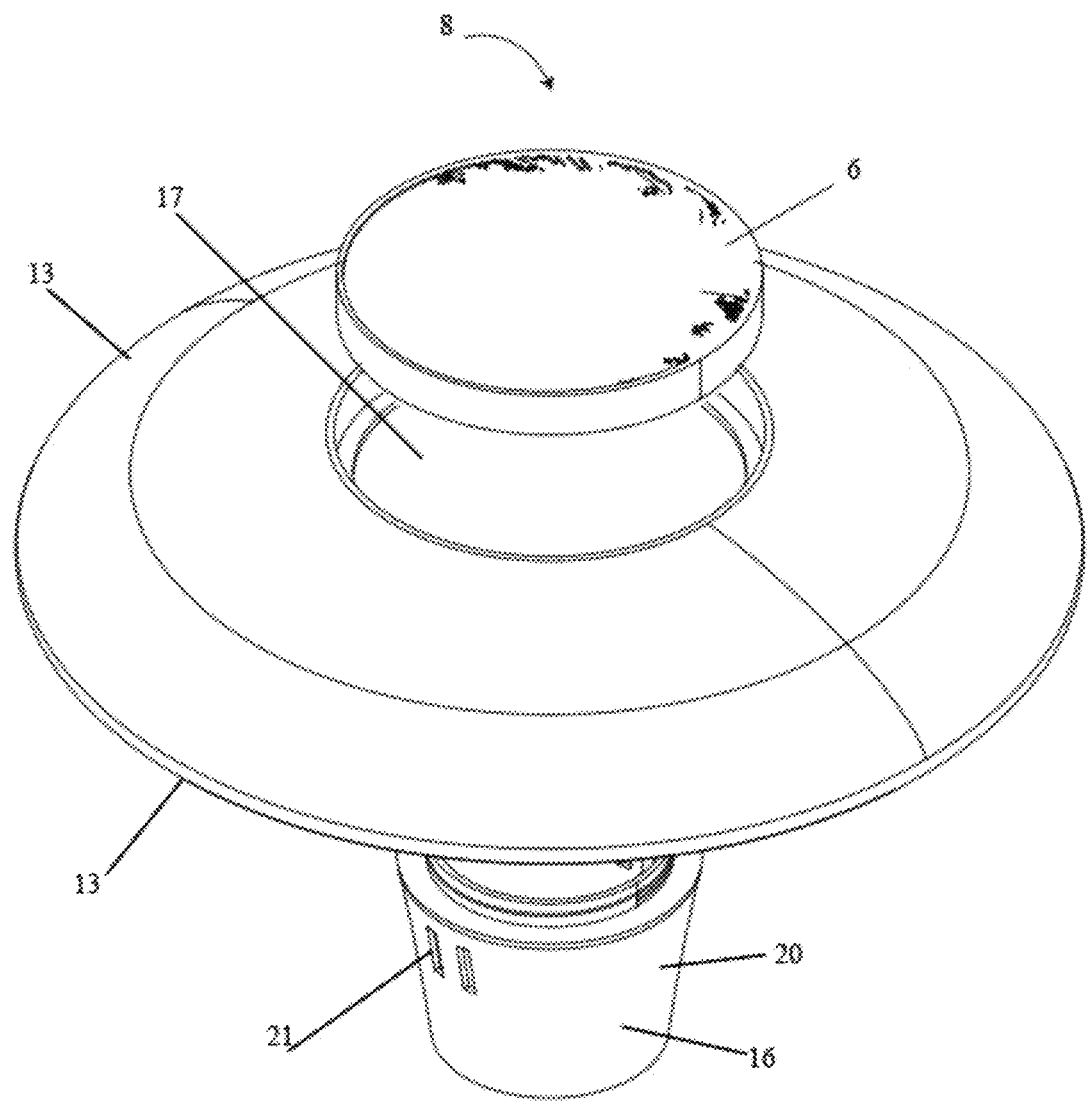
FIG. 5 is an isomeric view of one embodiment of a float in accordance to one, or more embodiments.

Referring now to FIGS. 5-6, a float, shown generally at 8, can be any device that can at least partially float on water. In a preferred embodiment, the float 8 can comprise a body 12 wherein the body 12 can comprise an upper portion 13 and a lower portion 16. The upper portion 13 can be configured to float partially below the liquid medium, and partially above the liquid medium. In certain embodiments, the upper portion 13 can float substantially above the liquid medium or substantially below the liquid medium. The body 12 has a buoy 13 and an extension 16. The buoy 13 has a large, substantially hollow volume and can further comprise an upper cavity 17 that can at least partially extend vertically down into the buoy 13 wherein the upper cavity 17 can have a lid 6 removably attached to it. The circumference of the buoy 13 and the extension 16 may be any shape, but is shown as substantially circular. A generally symmetrical shape with the weight of the body focused in the center may allow better balance, but may be irregularly distributed and the shape of the buoy 13 may be configured to balance the weight distribution of the buoy 13 or the extension 16. The exterior of the buoy 13 can gradually transition to the exterior of the extension. The extension 16 can be removably attached to the buoy 13 by such as, threads, clips, tabs, press fit, loose fit, or the like. The extension 16 can further comprise a chemical dispenser 20 wherein the chemical dispenser is a cavity that can allow chemicals such as chlorine, oxidizers, water balancers, or the like, to be selectively released into the water through at least one port 21. The port 21 can be at least one through hole allowing the water access to the chemicals inside the extension, selectively releasing the chemicals into the water. The timing and amount of chemical released into the water may be controlled by the microcontroller by, for example, releasing a predetermined amount of the chemical into a cavity in fluid communication with the port at predetermined periods or in response to a reading from one or more sensors, opening access to a cavity in which the chemical is situated at a predetermined time or in response to a reading from one or more sensors, granting fluid access to a desired surface area of a chemical, or the like. The port 21 can be in the shape of a circle, square, rectangle, hexagon, or the like. The port 21 can go through one side or through multiple sides of the extension 16. The float 8 can be manufactured from plastics such as, for example, polyethylene terephthalate glycol, acrylonitrile butadiene styrene, acrylic, polycarbonate, or the like, or any material that remains durable with prolonged exposure to chlorinated water and sun.

The sensing system 4 can be coupled to the float 8 to form a floating pool system 10. The float 8 can be an aftermarket device, wherein the alarm body 14 is configured to be housed within the lid 8, or to replace the lid 8. The float 8 can be made specifically for the sensing system 4, wherein the sensing system 4 can be removable from, or integral with the float 8. The floating pool alarm system 10 can comprise an LED 76 which can be aesthetically pleasing when in a dark environment and can alert the user visually if there is a disturbance within the water.

Figure 7:
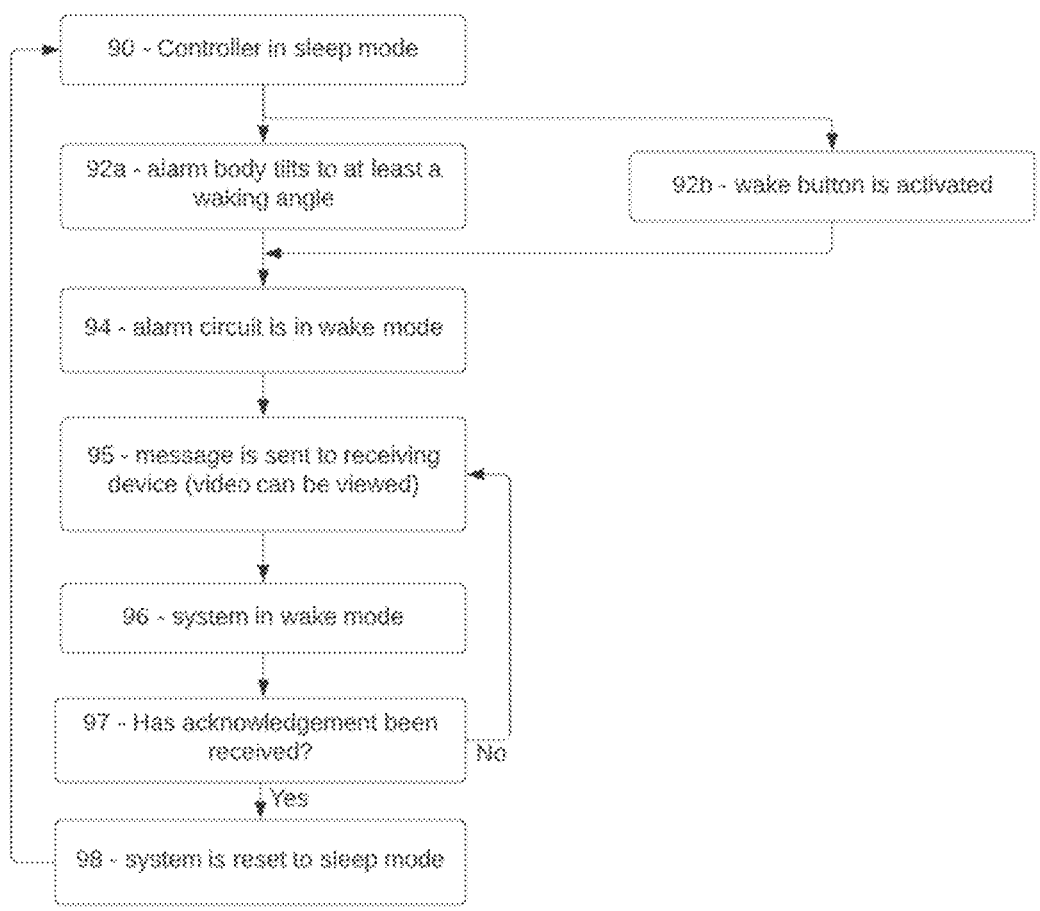
FIG. 7 is flow chart example for one embodiment of a sensing system for pool float in accordance to one, or more embodiments.
Figure 8:
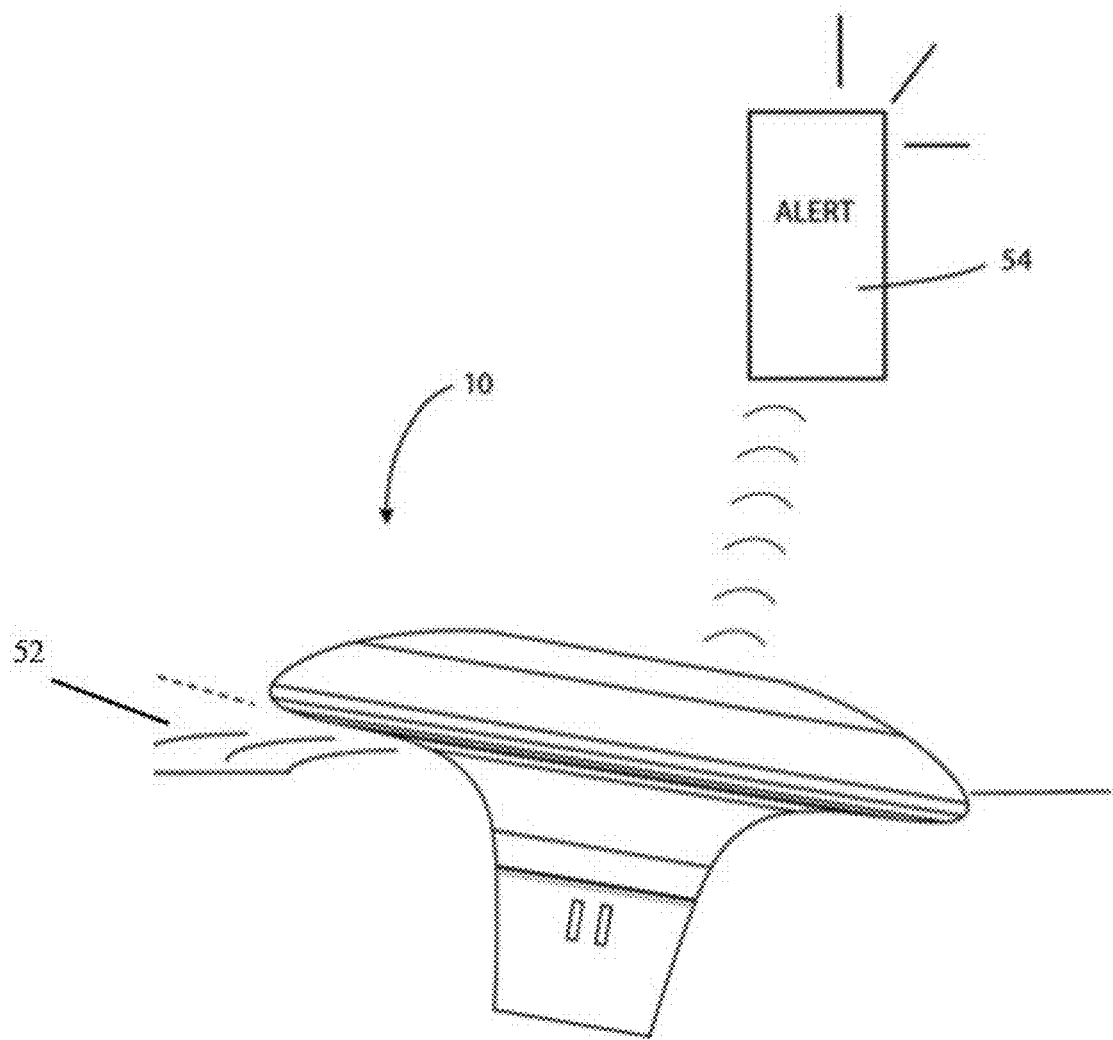
FIG. 8 is one embodiment of a waking event of a sensing system for pool float in accordance to one, or more embodiments.

Referring now to FIGS. 7-8. In use the sensing system 4 is in sleep mode for extended periods of time waking only when a waking event occurs [step 90]. In one or more embodiments the tilt sensors 15 are ball tilt switches and are set at an angle of at least 10 degrees and in the open position as the default or neutral position, or sleep mode. This allows for lower energy usage, extending the life of the power source 23. When the floating pool system 10 is in the vertical position, the tilt sensors are open, and the sensing system 4 is in sleep mode.

[step 92] The sensing system remains in sleep mode until a waking event occurs. The waking event can be when the floating pool system 10 is tilted past a waking angle 52 of at least 10 degrees, causing at least one tilt sensor 15 to close. The waking event can also be the activation of the wake button 19.

[Step 94] The waking event puts the sensing system 4 in wake mode.

[Step 95] Based on the mode, the controller 18 can send a message to the receiving device 54, alerting the user that the system is in wake mode, or that there has been a disturbance in the water. The wireless module 43 can utilize any wireless communication system, such as, Wi-Fi, Bluetooth, cellular, and the like. The receiving device 54 can deliver the message to the user with a visual, audio, or tactile message/alert, such as, a text message, a light, a flashing light, a vibration, a voice message, a siren, a video, a live stream video, or the like. The message can be a generic message, a custom message, an audible alarm, or the like, notifying the user that a child or large object has entered the water. The message can be delivered through an app. The app can be a third-party app, such as PushOver, IFTTT, and the like, or it can be an app specific for the sensing device 4 or floating pool system 10. The receiving device may include a camera situated to observe the cite of the cite of the sensing system 4. The waking event may activate the camera and notify a user such that the user can observe the area of the sensing system 4 when a waking event has been detected.

[Step 96] The controller can continue to send the message to the receiving device 54 until an acknowledgement is received, and/or the receiving device 54 can continue to alert the user until an acknowledgement is sent. An acknowledgement can be the user opening the message, the user sending an acknowledgement, or any interaction that would indicate the user has received the message.

[step 97] The receiving device 54 can determine that the user has received the message and acknowledges receipt of the message to the controller.

[step 98] The sensing system 4 can reset to sleep mode based on the status of the message. If the message has been received, the system can change to sleep mode. The system 4 can return to sleep mode as quickly as 10 seconds after wake mode was instigated saving power.

Various messages or information can be sent by the controller 18 and received by the receiving device 54, such as, wake mode, power level, temperature, chlorine level, pH level, and the like. The receiving device can also display a monitor of the mode, power level, temperature, chlorine level, pH level, and/or the like.

The body 12 can be shaped in a way to minimize false alarms in the system wherein the shape will only tilt to a waking angle 52 when there is a major disturbance in the water such as a child falling in.

The floating pool system 10 can differentiate between a disturbance caused by wind blowing and a disturbance caused by a child entering the water. In certain embodiments a camera can be coupled to the controller 18. The camera can be connected to the alarm body, or it can be remote from the alarm body, such as on the float 8, or a pool deck. The user can use the camera to remotely and quickly investigate the cause of the waking event.

It is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A system for detecting and alerting a user of disturbances comprising:
   an alarm body comprising a housing configured to couple to a float;
   a controller coupled to the alarm body, comprising a wireless communication module and a plurality of tilt sensors coupled to the controller in an array at an angle of at least 10 degrees wherein the plurality of tilt sensors are configured to sense tilting in all directions to indicate alerting conditions;
   a power source electrically coupled to the controller; and
   a remote computing device wirelessly connected to the controller to receive the alerting conditions.

2. The system of claim 1, wherein the float is a body capable of floating in a liquid medium wherein the body has a lower portion configured to sit below the liquid medium and an upper portion configured to float partially below and partially above the liquid medium wherein the upper portion comprises the alarm body partially extending vertically through the upper portion and the lower portion having at least one port open to the liquid medium.

3. The system of claim 2, wherein the lower portion further comprises a cavity wherein chlorine is dispensed into the liquid medium through the at least one port.

4. The system of claim 2, wherein at least one of the plurality of tilt sensors has a sensing element that is in contact with the liquid medium.

5. The system of claim 1, further comprises at least one of a chlorine sensor, thermometer, camera, and a pH detection sensor.

6. The system of claim 1, wherein the plurality of tilt sensors are ball switch sensors.

7. The system of claim 1, wherein the controller further comprises at least a wake mode and a sleep mode.

8. The system of claim 7, wherein wake mode is active after a waking event.

9. The system of claim 7, wherein sleep mode is determined by the plurality of tilt sensors being in the open position.

10. The system of claim 1, wherein the power source is at least one of at least one battery, at least one long life battery, at least one rechargeable battery, at least one disposable battery, at least one AAA alkaline battery, and at least one photovoltaic panel.

11. The system of claim 10, wherein the at least one photovoltaic panel is used to recharge the at least one rechargeable battery.

12. The system of claim 1, wherein the controller further comprises a wake button to manually initiate wake mode.

13. The system of claim 1, wherein the alarm body comprises at least one of polyethylene terephthalate glycol (PETG), nickel alloy, and fiberglass.

14. The system of claim 1, wherein the wireless communication module comprises at least one of: Wi-Fi, cellular, and Bluetooth.

* * * * *